Sept. 27, 1960     F. G. REUTER ET AL     2,954,251

ELASTIC COUPLING FOR JOINTED MEMBERS

Filed July 24, 1958

INVENTORS
FRANZ GOTTFRIED REUTER
GEORG KINDEL

BY

ATTORNEYS

United States Patent Office 2,954,251
Patented Sept. 27, 1960

2,954,251

ELASTIC COUPLING FOR JOINTED MEMBERS

Franz Gottfried Reuter and Georg Kindel, Lemforde, Hannover, Germany, assignors, by mesne assignments, to Mobay Chemical Company, Pittsburgh, Pa., a corporation of Delaware Filed July 24, 1958, Ser. No. 750,755

Claims priority, application Germany July 26, 1957

2 Claims. (Cl. 287—85)

This invention relates generally to flexible joints and, more particularly, to an improved flexible joint between the tie rod and the lever arm of a vehicle steering mechanism.

The coupling between the tie rod or tie bar and the lever arm of a steering mechanism of heavy vehicles must be of such a construction that angular deflection is possible in order that stiffness in the steering gear will be avoided. It is also necessary that these joints be of such a construction that they will not wear excessively and play or looseness will not develop between the parts as the steering mechanism is used. It has been the custom heretofore to manufacture the joint between the tie bar and lever arm with ball joints which provide angular deflection in all directions. This type of joint has not been entirely satisfactory, however, because the construction of such a joint is expensive and often the mechanism must be repaired or replaced. It has also been proposed to provide lubricated couplings having elastic elements therein. These elastic elements have heretofore been provided with interior inserts, such as a fabric impregnated with a lubricant which is noninjurious to rubber, such as graphite; however, these composite elements are expensive to manufacture and have but a limited service life.

It is therefore an object of this invention to provide a simple, economical yet reliable flexible joint between the tie bar and lever arm of a steering mechanism. Another object of the invention is to provide an improved flexible joint between the tie bar and lever arm of a steering mechanism which is resistant to wear and provides the optimum angular deflection in any direction. Still another object of the invention is to provide an elastic coupling between a tie bar and a pin-hinged lever arm in the steering mechanism of heavy vehicles which provides the necessary amount of angular deflection and is adapted to withstand wear during the life of the coupling and is more or less free from maintenance problems. A further object of the invention is to provide an oil, grease, and abrasion-resistant elastic coupling between a tie bar and a pin-hinged lever arm in the steering mechanism of heavy vehicles. Still another object of the invention is to provide means for lubricating the elastic coupling.

Other objects will become apparent from the following description with reference to the accompanying drawings in which.

Figure 1:
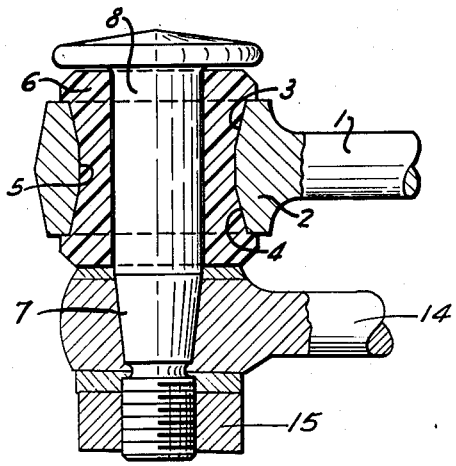
Figure 1 illustrates one preferred embodiment of the invention.

In accordance with the elastic coupling described in our application Serial No. 644,670, filed March 7, 1957, now abandoned, of which this application is a continuation-in-part, the foregoing objects as well as others are accomplished by providing a flexible joint having an elastic bushing, between the tie bar and pin or bolt connecting the tie bar to the lever arm of the steering mechanism. The bushing provided is made of a polyurethane plastic containing a silicone oil, molybdenum disulfide, and usually a hydrocarbon. Such a bushing provides a sturdy elastic coupling which permits angular deflection of the tie bar and provides a rigid steering mechanism.

Generally speaking, in accordance with the instant invention, it has now been found that the foregoing objects as well as others are achieved by providing means for lubricating, with conventional lubricants, a flexible joint having a shaped polyurethane plastic bushing between the tie bar and pin or bolt connecting the tie bar to the lever arm of the steering mechanism. It has now been found that the addition of the lubricating means permits an improved angular deflection of the tie bar when the polyurethane bushing contains such additives as silicone oil, molybdenum disulfide, and a hydrocarbon. Furthermore, by providing lubricating means for the elastic coupling, a substantially equal angular deflection is permitted even though the polyurethane plastic bushing does not contain the additives mentioned.

The bore at the end of the tie rod is provided with a double tapered inner wall with the minimum diameter at the center thereof which, in combination with the polyurethane plastic bushing, provides the maximum amount of angular deflection in any direction and, at the same time, provides a coupling having the required amount of rigidity necessary in steering mechanisms. Actually, in a preferred embodiment, the bore of the tie rod is cylindrical at the center of the thickness of the tie rod and this cylindrical surface extends on each side of the center line for a short distance. The bore then flares outwardly to form the double tapered bore.

The polyurethane plastic used for making the bushing may be prepared by reacting any suitable polyhydroxy compound with a polyisocyanate and a cross-linking agent. Linear polyesters, polyester amides, polyalkylene ether glycols and polyalkylene thioether glycols having terminal hydroxyl groups are examples of suitable polyhydroxy compounds. Preferably, one of these compounds or a mixture thereof is reacted with an excess of a suitable diisocyanate and the reaction product is then reacted with a bifunctional compound which will bring about cross-linking, such as, for example, a glycol, a diamine, an amino alcohol or water. Suitable elastic rubber-like polyurethane plastics may be made in accordance with the process disclosed in U.S. Patents 2,620,516, 2,621,166, 2,729,618, 2,755,266, 2,764,565, and 2,778,810.

In order to impart the necessary properties to the bushing, in the preferred embodiment the polyurethane plastic is mixed with a silicone oil and molybdenum disulfide. Best results are obtained if a hydrocarbon is also incorporated in the polyurethane bushing. The molybdenum disulfide, hydrocarbon and silicone oil may be introduced into the polyurethane plastic at any stage during the reaction between the polyhydroxy compound and the polyisocyanate, but it is preferred to mix these additives with the reaction mixture before reaction between the polyhydroxy compound and the polyisocyanate. A convenient method of incorporating the additives into the polyurethane plastic is to first mix them with the polyhydroxy compound and to then combine this mixture with the polyisocyanate. After the reaction between the polyhydroxy compound and the polyisocyanate, cross-linking is brought about by adding a cross-linker or chain-extender, such as water, a glycol or a diamine, and heating the mixture.

Any suitable hydrocarbon may be utilized, such as, for example, high-boiling petroleum fractions, including kerosene and conventional lubricating oils and waxes, including paraffin, beeswax, ceresin, and the like.

The molybdenum disulfide should preferably be of a high technical grade and of high purity and if it approaches chemically pure molybdenum disulfide, it may be advantageously incorporated into the reaction mixture after the polyisocyanate has been mixed with the organic compound having the terminal hydroxyl groups. Methods for preparing substantially pure molybdenum disulfide are disclosed in U.S. Patents 2,367,946 and 2,686,156. The products of the methods disclosed in these patents are particularly well suited for use in this invention.

From about 0.01% to about 5% by weight, and preferably from about 0.1% to about 1% by weight, based on the weight of the cured rubber-like polyurethane plastic, molybdenum disulfide is used in accordance with this invention in preparing the plastic bearing surface. Any suitable solid form of molybdenum disulfide may be used, but it is preferred to use a molybdenum disulfide powder having a particle size within the range of from about 0.002 mm. to about 2 mm. in cross-sectional dimension and preferably from about 0.002 mm. to about 0.02 mm. in order to obtain maximum abrasion resistance.

The combined amount of silicone oil and hydrocarbon used in preparing the bearing surface is preferably from about 0.01% to about 5% by weight, based on the weight of the cured rubber-like polyurethane plastic, but in some instances even greater amounts may be used if desired.

The molecular weight of the polyester or other polyhydroxy compound should be at least about 800.

Any suitable liquid organo-polysiloxane may be used as the silicone oil provided the viscosity thereof is from about 50 to about 500 centistokes at 20° C. Examples of suitable silicone oils include dimethylsiloxane polymers having a viscosity of about 50 centistokes, dimethylsiloxane polymers having a viscosity of about 140 centistokes at 20° C. and dimethylsiloxane polymers having a viscosity of about 440 centistokes at 20° C. and mixtures thereof.

Any suitable linear hydroxy polyester may be used, including those disclosed in the aforesaid patents, U.S. 2,620,516 and 2,729,618. For example, polyesters formed by conventional thermal esterification methods of dihydric alcohols and dibasic organic acids may be used as the organic compound having the terminal hydroxyl groups. The alcohol component should be used in such amount as to produce a final product having an hydroxyl number within the range of from about 20 to about 80. Examples of suitable dicarboxylic acids include adipic acid, succinic acid, and the like. The dihydric alcohol may be ethylene glycol or other suitable glycol. A convenient method for carrying out the thermal esterification involves heating the reactants to a temperature of from about 110° C. to about 120° C. until water formed during the esterification is removed by distillation and then raising the temperature to from about 210° C. to about 220° C. under reduced pressure until esterification is completed. The resulting polyester having terminal hydroxyl groups is then dehydrated by maintaining it at a temperature of from about 110° C. to about 150° C. under a pressure less than atmospheric or while covered with an inert gas, such as nitrogen, until all of the moisture has been removed. If a polyesteramide is to be produced, a certain amount of an amine or an amino alcohol is mixed with the other starting materials used in making the polyester. Suitable polythioethers may be prepared by thermal condensation of a thioether glycol with a polyhydric alcohol in a molar ratio of from about 1:1 to about 1:1.5. The reaction mixture is heated in the presence of a dehydration catalyst to a temperature of from about 150° C. to about 250° C. to remove the water formed during esterification or etherification by distillation.

Any suitable diisocyanate may be used to react with the linear hydroxyl polyester, polyalkylene ether glycol or polyalkylene thioether glycol, including 2,4-toluylene diisocyanate, 2,6-toluylene diisocyanate, p-phenylene diisocyanate, 4,4'-diphenylmethane diisocyanate, 1,5-naphthylene diisocyanate, dibenzidene diisocyanate, and benzidene diisocyanate. From about 20 percent to about 250 percent excess diisocyanate over that required to react with all of the reactive hydrogen atoms of the polyester or other organic compound having terminal hydroxyl groups should be used and the reaction is preferably carried out at temperatures of from about 80° C. to about 180° C. The isocyanate-modified polyester is subjected to a cross-linking reaction with a glycol, diamine, amino alcohol or other suitable bifunctional compound to obtain a cured rubber-like polyurethane plastic. Any suitable glycol such as, for example, 1,2-propylene glycol, 1,3-butylene glycol, 1,4-butylene glycol, quinite or the like, may be utilized. Examples of suitable amino alcohols include amino propanol, beta-amino propanol, and gamma-amino alcohol. The mixture of isocyanate-modified polyester or isocyanate-modified condensation product of a polyalkylene thioether glycol or polyalkylene ether glycol with the polyhydric alcohol is heated from a temperature of about 60° C. to about 180° C. until the cross-linking reaction has been completed. It is preferred to dissolve a small amount of acid, such as dry hydrogen chloride, or an acid-producing compound, such as, for example, acid chlorides, like acetyl chloride or thionyl chloride, in the cross-linking agent to slow down the cross-linking reaction which is accelerated by the presence of molybdenum disulfide. Usually from about 0.001% to about 1% acid, and preferably, from about 0.002% to about 0.1% by weight, based on the weight of the cross-linking agent, is used.

As already pointed out, the required amount of molybdenum disulfide, silicone oil and hydrocarbon is preferably added to the polyester or other polyhydroxy compound but, if desired, in some instances, it may be added to the isocyanate-modified polyhydroxy compound or to the cross-linking agent.

It has been found that bearing surfaces of rubber-like polyurethane plastics having the molybdenum disulfide and silicone oil display an extraordinarily low coefficient of friction. For example, the coefficient of friction between the rubber-like polyurethanes and steel is about 0.1.

Referring now to the drawings, Figure 1 illustrates a tie bar 1 terminating in a housing 2 having an inner bore with side walls with surfaces 3, 4, and 5 is shown with pin 8 inserted therein. Lying between pin 8 and housing 2 is a bushing 6 of polyurethane plastic containing about 1% by weight molybdenum disulfide and about 1% silicone oil. The polyurethane plastic is prepared from about 1,000 parts by weight of a linear polyester obtained by thermal esterification of adipic acid with ethylene glycol and having a molecular weight of about 2,000, an hydroxyl number of about 50 and an acid number of about 1 heated at about 135° C. at less than atmospheric pressure and preferably at a pressure approaching a vacuum for about one hour until substantially all the moisture has been removed. About 3 parts molybdenum disulfide powder having a particle size of about 0.01 mm. in diameter, about 3 parts of a dimethylsiloxane polymer having a viscosity of about 140 centistokes at 20° C., and about 2 parts paraffin wax are then added to the polyester. About 300 parts by weight naphthylene-1,5-diisocyanate are next introduced into the mixture and reaction is brought about by allowing the mixture to set for about 10 minutes while the pressure in the reaction vessel is less than atmospheric. About 70 parts 1,4-butanediol containing about 1% dry hydrogen chloride are added within about 1 minute while stirring the mixture vigorously. The resulting mixture is poured into a suitable mold and maintained at about 110° C. for about 24 hours or until the polyurethane plastic has cured into a rubber-like polyurethane plastic of the desired size and shape for bushing 6.

It is to be noted that housing 2 of the tie bar 1 in the drawing is provided with a double tapered inner wall. In other words, the wall is double conical shaped with the minimum internal diameter of the housing before the cylindrical portion at the center. As shown in the drawing, housing 2 has its minimum diameter at face 5 and the diameter gradually increases to form tapered surfaces 3 and 4. This type of tapered wall combined with the polyurethane plastic provides the maximum amount of angular deflection. Pin 8 connects to the lever arm 14, the pin being provided with a cylindrical surface in the area within the bushing and being frusto-conical shaped at 7. The particular pin shape shown provides angular deflection for the tie bar and it can twist within the bushing 6. The addition of the silicone oils, molybdenum disulfide and hydrocarbons facilitates the twisting of pin 8 within the bushing 6. Nut 15 holds lever arm 14 in place.

Figure 2:
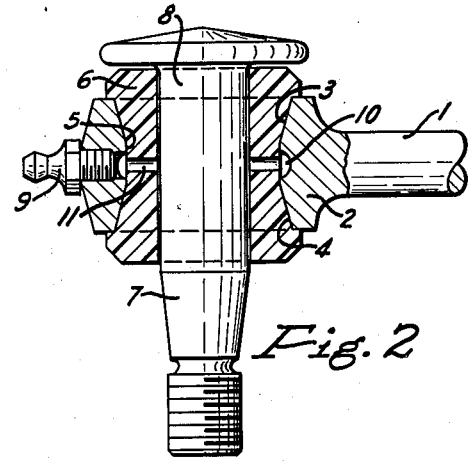
Figure 2 illustrates still another embodiment of the invention.

Figure 2 illustrates another embodiment of the invention in which a grease fitting 9 is provided in the wall of the bearing housing 2. The bearing housing wall at the surface 5 is provided with a semi-circular groove 10 about its interior diameter. The bushing 6 is provided with a plurality of ports 11, alined with the groove 10 which communicate through the bushing to the surface of the pin 8. In this embodiment, a lubricant is forced under pressure from the grease fitting 9 around the groove 10 in the housing 2 and through the communicating ports 11 to the pin 8, thus lubricating the coupling and, at the same time, expelling any foreign matter, such as, sand, dirt, and the like from the coupling.

Figure 3:
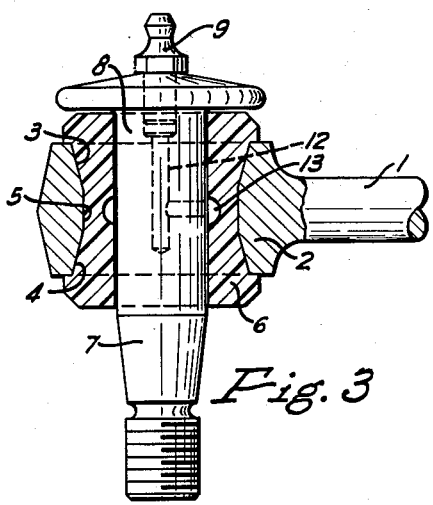
Figure 3 illustrates a further embodiment of the invention.

Figure 3 illustrates yet another embodiment of the invention in which a grease fitting 9 is provided in one end of the pin 8. A port 12 is provided in the pin 8 which communicates with the bushing 6 which is provided with an interior semi-circular groove 13.

Although the invention has been described in considerable detail in the foregoing, it is to be understood that such detail is solely for the purpose of illustration and that variations can be made by those skilled in the art without departing from the spirit or scope of the invention except as is set forth in the claims. For example, the bushing may be cut from sheets of blocks of cured polyurethane instead of being molded to the required size and shape, if desired.

What is claimed is:

1. In a lubricated flexible joint between a tie rod and a lever arm, said tie rod terminating in a housing, said housing having a bore therethrough, a pin positioned in said bore and connected to said lever arm, an elastic polyurethane plastic bushing disposed between said pin and housing, and means for introducing lubricant to said joint.

2. A flexible joint between a tie rod and the lever arm of a steering mechanism comprising a tie rod terminating in a housing, a pin extending through the housing in said rod and connected to said lever arm, and between the pin and housing an elastic polyurethane plastic bushing having a coefficient of friction with steel of about 0.1 containing up to about 5% by weight of a silicone oil and molybdenum disulfide.

References Cited in the file of this patent

UNITED STATES PATENTS

| | | |
|---|---|---|
| 1,971,676 | Borst | Aug. 28, 1934 |
| 2,083,609 | Lefevre | June 15, 1937 |
| 2,312,516 | Alldredge | Mar. 2, 1943 |
| 2,778,664 | Herbenar | Jan. 22, 1957 |

FOREIGN PATENTS

| | | |
|---|---|---|
| 327,801 | Great Britain | Apr. 17, 1930 |
| 620,882 | Great Britain | Mar. 31, 1949 |
| 748,096 | France | Apr. 10, 1933 |